US012202271B2

(12) United States Patent
Nakazawa et al.

(10) Patent No.: US 12,202,271 B2
(45) Date of Patent: Jan. 21, 2025

(54) LIQUID DISCHARGING APPARATUS

(71) Applicant: BROTHER KOGYO KABUSHIKI KAISHA, Nagoya (JP)

(72) Inventors: Fumio Nakazawa, Okazaki (JP); Yoshinori Osakabe, Seto (JP); Hiroyuki Ishikawa, Nisshin (JP); Yuji Koga, Nagoya (JP); Naoya Okazaki, Hashima (JP); Akira Iriguchi, Ichinomiya (JP); Shingo Ito, Kasugai (JP); Toshio Sugiura, Anjo (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/704,570

(22) Filed: Mar. 25, 2022

(65) Prior Publication Data

US 2022/0305799 A1 Sep. 29, 2022

(30) Foreign Application Priority Data

Mar. 26, 2021 (JP) ................................ 2021-053838

(51) Int. Cl.
*B41J 2/175* (2006.01)
*B41J 2/14* (2006.01)

(52) U.S. Cl.
CPC ....... *B41J 2/17513* (2013.01); *B41J 2/14201* (2013.01); *B41J 2/1752* (2013.01)

(58) Field of Classification Search
CPC .. B41J 2/17513; B41J 2/14201; B41J 2/1752; B41J 2/14; B41J 2/17503
(Continued)

(56) References Cited

U.S. PATENT DOCUMENTS 5,745,138 A 4/1998 Ostermeier
6,378,973 B1 4/2002 Kubota et al.
(Continued)

FOREIGN PATENT DOCUMENTS

CN 109318596 A 2/2019
JP 55-65560 5/1980
(Continued)

OTHER PUBLICATIONS

Extended European Search Report issued in corresponding European Patent Application No. 22164165.7, Aug. 12, 2022.
(Continued)

*Primary Examiner* — Jason S Uhlenhake
*Assistant Examiner* — Alexander D Shenderov
(74) *Attorney, Agent, or Firm* — Merchant & Gould P.C.

(57) ABSTRACT

There is provides liquid discharging apparatus including: head having nozzle; reservoir configured to store the liquid such that liquid surface is positioned higher than opening of the nozzle in a state that the reservoir stores the liquid of maximum storable amount; and atmosphere port connecting gas layer and outside of the reservoir. Inner diameter d of the nozzle and head difference h satisfy expression of $\rho hd/\sigma \cos \theta \leq 4/g$, provided that ρ is specific weight of the liquid, σ is surface tension of the liquid, θ is contact angle of the liquid in the nozzle and g is gravitational acceleration, the head
(Continued)

difference h being difference in height between meniscus in the opening of the nozzle and the liquid surface in the state that the reservoir stores the liquid of the maximum storable amount.

19 Claims, 11 Drawing Sheets

(58) Field of Classification Search
USPC ........................................................... 347/86
See application file for complete search history.

(56) References Cited

U.S. PATENT DOCUMENTS

2001/0051334 A1* 12/2001 Barth .................... B01L 3/0268 422/522
2004/0021714 A1 2/2004 Kitami et al.
2004/0212655 A1* 10/2004 Sasa .................... B41J 2/17553 347/30
2005/0117003 A1 6/2005 Kyogoku et al.
2006/0044369 A1* 3/2006 Mutoh ................. B41J 2/17596 347/85
2008/0158307 A1* 7/2008 Nitta ........................ B41J 2/175 347/85
2010/0245501 A1* 9/2010 Kanbe .................. B41J 2/17509 347/86
2016/0263900 A1* 9/2016 Kimura ................ B41J 2/17566

FOREIGN PATENT DOCUMENTS

JP 7-81079 A 3/1995
JP 2000-168103 A 6/2000
JP 2000-334965 A 12/2000
JP 2004-122760 A 4/2004
JP 2005-161635 A 6/2005
JP 2006-315232 A 11/2006
JP 2008-246785 A 10/2008
JP 2010-149456 A 7/2010

OTHER PUBLICATIONS

Notice of Reasons for Refusal of Japanese Patent Application No. 2021-053838, Nov. 5, 2024.

* cited by examiner

LIQUID DISCHARGING APPARATUS

CROSS REFERENCE TO RELATED APPLICATION

The present application claims priority from Japanese Patent Application No. 2021-053838, filed on Mar. 26, 2021, the disclosure of which is incorporated herein by reference in its entirety.

BACKGROUND

The present disclosure relates to a liquid discharging apparatus having a head configured to discharge a liquid supplied from a reservoir.

As an apparatus which discharges an ink stored in a tank from a nozzle so as to perform recording of an image, an ink-jet pen is known. In this ink-jet pen, a liquid surface of the ink stored in an ink cartridge is positioned above an opening of the nozzle.

SUMMARY (1) A liquid discharging apparatus of an aspect of the present disclosure includes a head, a reservoir, and an atmosphere port.

The head has a nozzle configured to discharge a liquid.

The reservoir is configured to store the liquid such that the liquid has a liquid surface, and such that the liquid surface is positioned higher than an opening of the nozzle in a state that the reservoir stores the liquid of a maximum storable amount, the maximum storable amount being a maximum amount of the liquid capable of being stored in the reservoir.

The atmosphere port connects a gas layer of the reservoir and outside of the reservoir.

An inner diameter d of the nozzle and a head difference h satisfy the expression of $\rho hd/\sigma\cos\theta \leq 4/g$, provided that p is a specific weight of the liquid, $\sigma$ is a surface tension of the liquid, $\theta$ is a contact angle of the liquid in the nozzle and g is gravitational acceleration, the head difference h being a difference in height between a meniscus formed in the opening of the nozzle and the liquid surface in the state that the reservoir stores the liquid of the maximum storable amount.

According to the liquid discharging apparatus, the meniscus formed in the opening of the nozzle is maintained in a state that the reservoir in which the liquid is stored is communicated with the outside of the reservoir by the atmosphere port.

BRIEF DESCRIPTION OF THE DRAWINGS

FIGS. 6A and 6B are each a view for explaining maintaining of a meniscus formed in an opening of a nozzle 39, wherein FIG. 6A is a view schematically depicting a reservoir 80 and the nozzle 39, and FIG. 6B is a view depicting a state that the meniscus is formed in the opening of the nozzle 39.

FIGS. 8A and 8B are each a view depicting a specific example of the range in which the inner diameter (d) and the head difference (h) satisfy the expression (1), wherein FIG. 8A is a view depicting a range of the head difference (h) with respect to each of ranges of the inner diameter (d) and FIG. 8B is a view depicting a range of the inter diameter (d) with respect to each of ranges of the head difference (h).

FIGS. 11A and 11B are each a perspective view depicting an upper wall 82 of a reservoir 80 according to a modification, wherein FIG. 11A is a perspective view of a case that an atmosphere communicating channel 161 has a labyrinth structure 164, and FIG. 11B is a perspective view of a case that the atmosphere communicating channel 161 has the labyrinth structure 164 and a semipermeable membrane 165.

DETAILED DESCRIPTION

Figure 1:
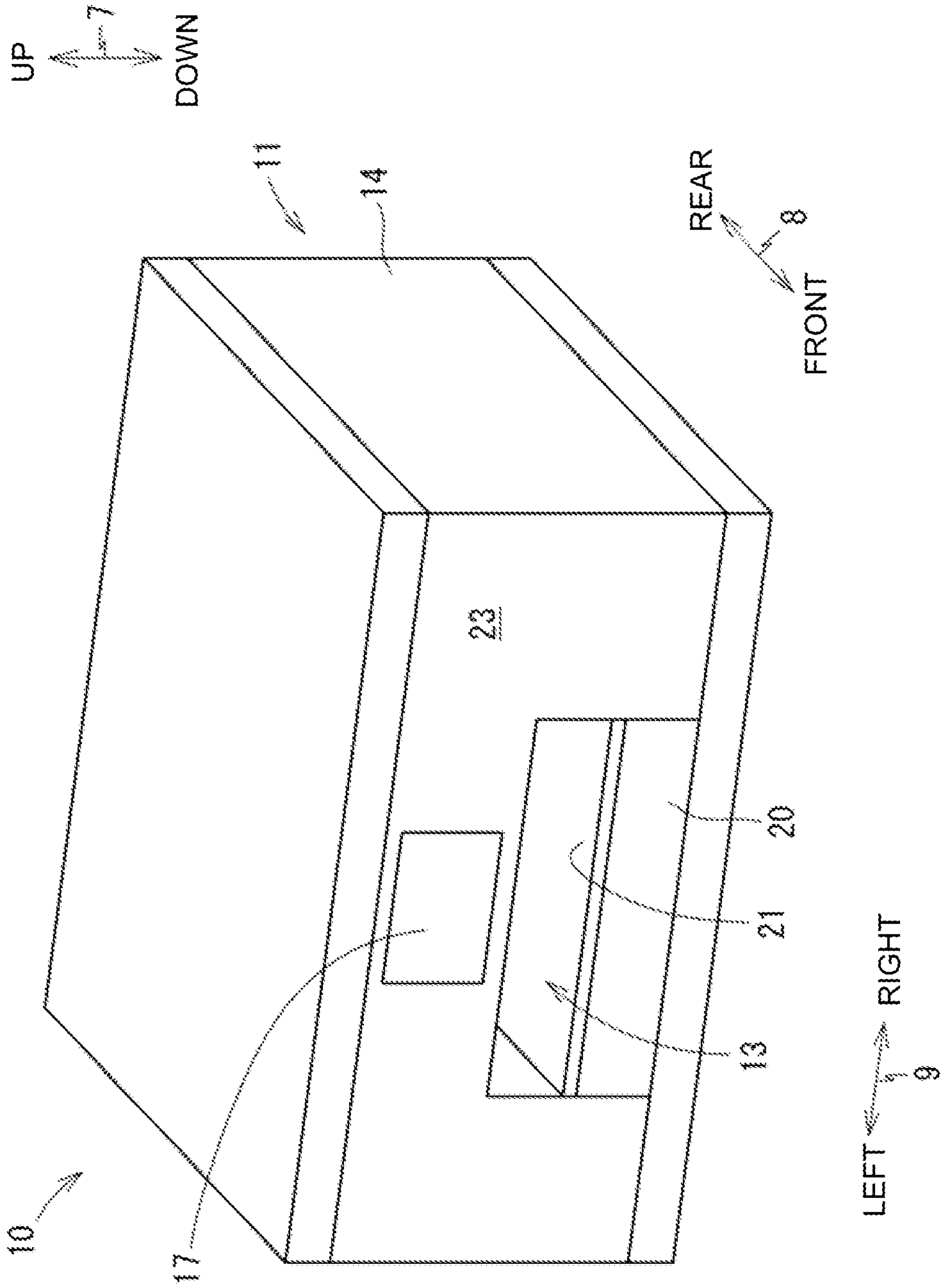
FIG. 1 is a perspective view of a multifunction peripheral 10.

It is assumed an ink cartridge, in which a gas layer is not communicated with outside, or in which a valve is provided on a gas channel which communicates the gas layer to the outside.

In a case that the gas layer of the ink cartridge is not communicated with the outside and that the ink is consumed, the pressure of the gas layer is lowered. As a result, there is a fear that a meniscus formed in the opening of the nozzle might be broken or destroyed. Further, in a case that the valve, etc., is provided so as to maintain the pressure of the gas layer of the ink cartridge to be constant while communicating the gas layer with the outside, the structure of the ink-jet head might become complex, or the size of the ink-jet head might become great. On the other hand, in a case that the gas layer of the ink cartridge is always communicated with the outside, there is such a fear that the meniscus formed in the opening of the nozzle might be destroyed due to the head difference (waterhead difference).

The present disclosure has been made in view of the above-described situation, and an object of the present disclosure is to provide means for maintaining the meniscus formed in the opening of the nozzle in a state that a reservoir in which a liquid is stored is communicated with the outside of the reservoir by an atmosphere port.

According to the present disclosure, the meniscus formed in the opening of the nozzle is maintained in a state that the reservoir in which the liquid is stored is communicated with the outside of the reservoir by the atmosphere port.

In the following, an embodiment of the present disclosure will be explained. Note that the embodiment which is to be explained below is merely an example of the present disclosure; it is needless to say that the embodiment can be appropriately changed without changing the gist of the present disclosure. Further, in the following explanation, advancement or movement (progress) directed from a starting point to an end point of an arrow is expressed as an "orientation", and going forth and back on a line connecting the starting point and the end point of the arrow is expressed as a "direction". Furthermore, in the following description, an up-down direction 7 is defined, with a state in which a multifunction peripheral 10 is operably installed (the state of FIG. 1) as the reference; a front-rear direction 8 is defined, with a side on which an opening 13 is provided being defined as a front surface 23; and a left-right direction 9 is defined, with the multifunction peripheral 10 as seen from the front side. The up-down direction 7, the front-rear direction 8, and the left-right direction 9 are orthogonal to one another.

[Overall Configuration of Multifunction Peripheral 10]

As depicted in FIG. 1, the multifunction peripheral 10 (an example of a "liquid discharging apparatus") has a casing (housing) 14 which has a substantially rectangular parallelepiped shape. A printer part 11 is provided at a lower part of the casing 14. The multifunction peripheral 10 has a various kinds of functions such as a facsimile function, a print function, etc. The multifunction peripheral 10 has a function, as the print function, of recording an image on one surface of a sheet 12 (paper sheet 12; see FIG. 2) in an ink-jet system. Note that the multifunction peripheral 10 may also be configured to record an image on both surfaces of the sheet 12. An operating part 17 is provided on an upper part of the casing 14. The operating part 17 is constructed of a button configured to be operated for instructing the image recording, for performing a various kinds of settings, etc., a liquid crystal display configured to display a various kinds of information thereon, and the like. In the embodiment, the operating part 17 is constructed of a touch panel having both of the function of the button and the function of the liquid crystal display.

Figure 2:
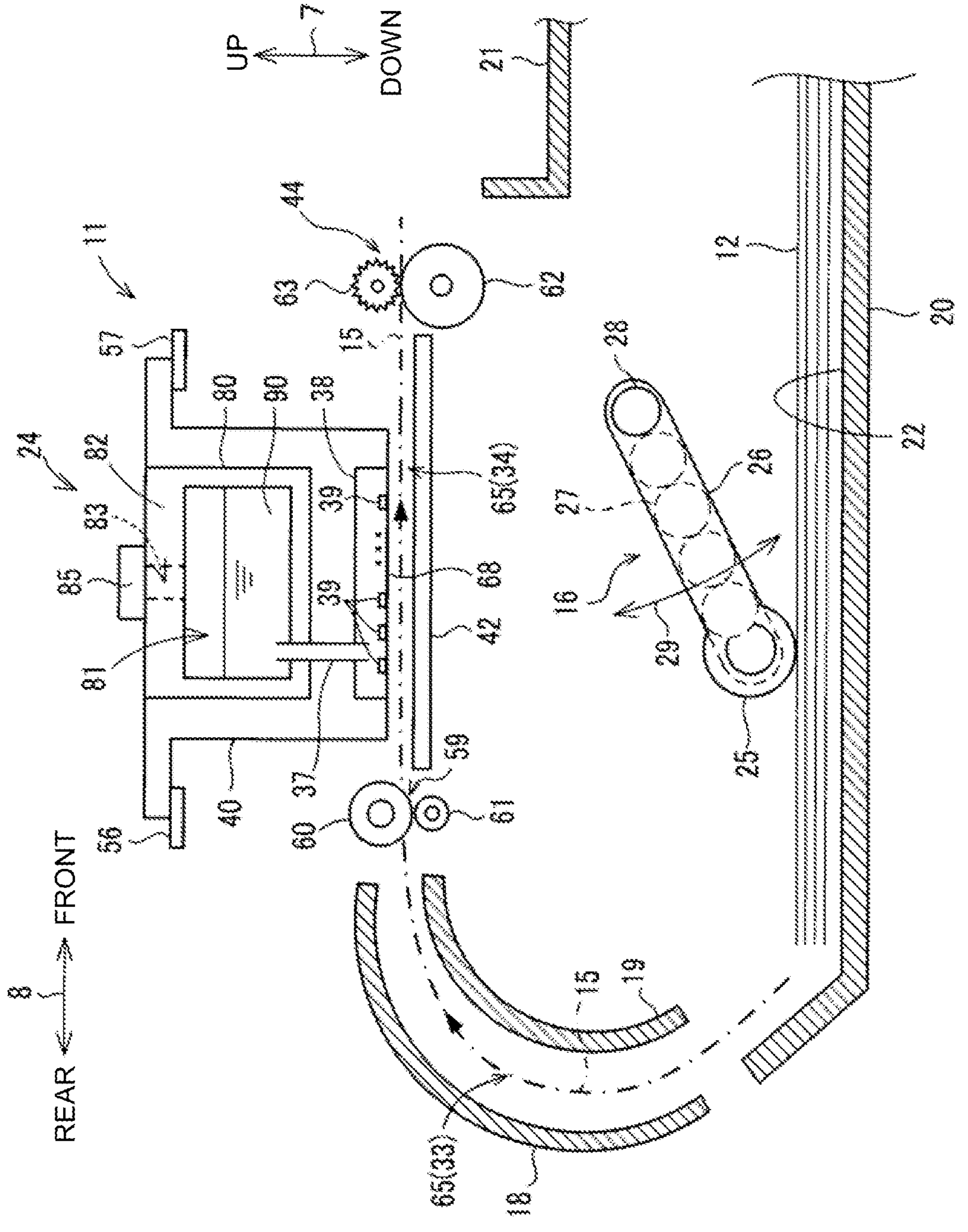
FIG. 2 is a vertical cross-sectional view schematically depicting the internal structure of a printer part 11.

As depicted in FIG. 2, the printer part 11 has a feed tray 20, a feeding part 16, an outer guide member 18, an inner guide member 19, a conveying roller pair 59, a discharging roller pair 44, a platen 42, a recording part 24, an encoder 35 (see FIG. 4), a rotary encoder 75 (see FIG. 4), a controller 130 (see FIG. 4) and a memory 140 (see FIG. 4) which are arranged inside the casing 14. In the inside of the casing 14, a various kinds of state sensors (not depicted in the drawings), which are configured to detect the state of the multifunction peripheral 10 and to output a signal in accordance with a result of detection, are arranged.

[Feed Tray 20]

As depicted in FIG. 1, an opening 13 is formed in the front surface 23 of the printer part 11. The feed tray 20 is insertable and removable with respect to the casing 14 via the opening 13, by moving in the front-rear direction 8. The feed tray 20 is movable between a feeding position (a position depicted in FIGS. 1 and 2) at which the feed tray 20 is installed in the casing 14, and a non-feeding position at which the feed tray 20 is removed (detached) from the casing 14. The feed tray 20 is inserted rearward with respect to the casing 14 to be moved to the feeding position, and the feed tray 20 is pulled frontward with respect to the casing 14 to be moved to the non-feeding position.

The feed tray 20 is a member having a box-like shape of which upper part is opened, and is configured to store a sheet 12. As depicted in FIG. 2, a plurality of pieces of the sheet 12 are supported by a bottom plate 22 of the feed tray 20 in a state that the sheets 12 are overlaid on each other. The discharge tray 21 is arranged at a location which is above a front part of the feed tray 20. A sheet 12 on which image recording has been performed by the recording part 24 and which is discharged is supported by an upper surface of the discharge tray 21. In a case that the feed tray 20 is at the feeding position, the sheet 12 supported by the feed tray 20 is allowed to be fed to a conveying route 65.

[Feeding Part 16]

As depicted in FIG. 2, the feeding part 16 is arranged at a location below the recording part 24 and above the bottom plate 22 of the feed tray 20. The feeding part 16 is provided with a feeding roller 25, a feeding arm 26, a driving transmitting mechanism 27 and a shaft 28. The feeding roller 25 is supported rotatably at a forward end part of the feeding arm 26. The feeding arm 26 rotates in a direction of an arrow 29, with the shaft 28 provided on a base part of the feeding arm 26 as the center of rotation. With this, the feeding roller 25 is capable of making contact with and separating away from the feed tray 20 or the sheet 12 which is supported by the feed tray 20.

The feeding roller 25 rotates by a driving force, of a feeding motor 102 (see FIG. 4), which is transmitted to the feeding roller 25 by the driving transmitting mechanism 27 constructed of a plurality of gears meshed with each other. With this, among the sheets 12 supported by the bottom plate 22 of the feed tray 20 at the feeding position, an uppermost sheet 12 which makes contact with the feeding roller 25 is fed to the conveying route 65. Note that the driving transmitting mechanism 27 is not limited to or restricted by the aspect in which the plurality of gears are meshed with each other; for example, the driving transmitting mechanism 27 may be a belt which is stretched or spanned between the shaft 28 and the shaft of the feeding roller 25.

[Conveying Route 65]

As depicted in FIG. 2, the conveying route 65 is extended from a rear end part of the feed tray 20. The conveying route 65 includes a curved part 33 and a straight part 34. The curved part 33 extends toward the upper side while making a U-turn from the rear side to the front side. The straight part 34 extends substantially along the front-rear direction 8.

The curved part 33 is formed by the outer guide member 18 and the inner guide member 19 which face or are opposite to each other, with a predetermined spacing distance therebetween. The outer guide member 18 and the inner guide member 19 are provided to extend in the left-right direction 9. At a position wherein the recording part 24 is arranged, the straight part 34 is formed by the recording part 24 and the platen 42 which face each other with a predetermined spacing distance therebetween.

The sheet 12 supported by the feed tray 20 is conveyed in the curved part 33 by the feeding roller 25, and reaches the conveying roller pair 59. The sheet 12 pinched or held by the conveying roller pair 59 is conveyed frontward in the straight part 34 toward the recording part 24. The recording part 24 records an image on the sheet 12 which has reached a location immediately below the recording part 24. The sheet 12 having the image recorded thereon is conveyed frontward in the straight part 34, and is discharged to the discharge tray 21. As described above, the sheet 12 is conveyed along a conveying orientation 15 which is indicated by an arrow of an alternate long and short dash line in FIG. 2.

[Conveying Roller Pair 59 and Discharging Roller Pair 44]

As depicted in FIG. 2, the conveying roller pair 59 is arranged in the straight part 34. The discharging roller pair 44 is arranged, in the straight part 34, on the downstream side in the conveying orientation 15 with respect to the conveying roller pair 59.

The conveying roller pair 59 includes a conveying roller 60 and a pinch roller 61 which is arranged at a location below the conveying roller 60 so as to face the conveying roller 60. The pinch roller 61 is pressed toward the conveying roller 60 by an elastic member (not depicted in the drawings) such as a coil spring, etc. The conveying roller pair 59 is capable of pinching or holding the sheet 12 therebetween.

The discharging roller pair 44 includes a discharging roller 62 and a spur roller 63 which is arranged at a location above the discharging roller 62 so as to face the discharging roller 62. The spur roller 63 is pressed toward the discharging roller 62 by an elastic member (not depicted in the drawings) such as a coil spring, etc. The discharging roller pair 44 is capable of pinching or holding the sheet 12 therebetween.

Figure 4:
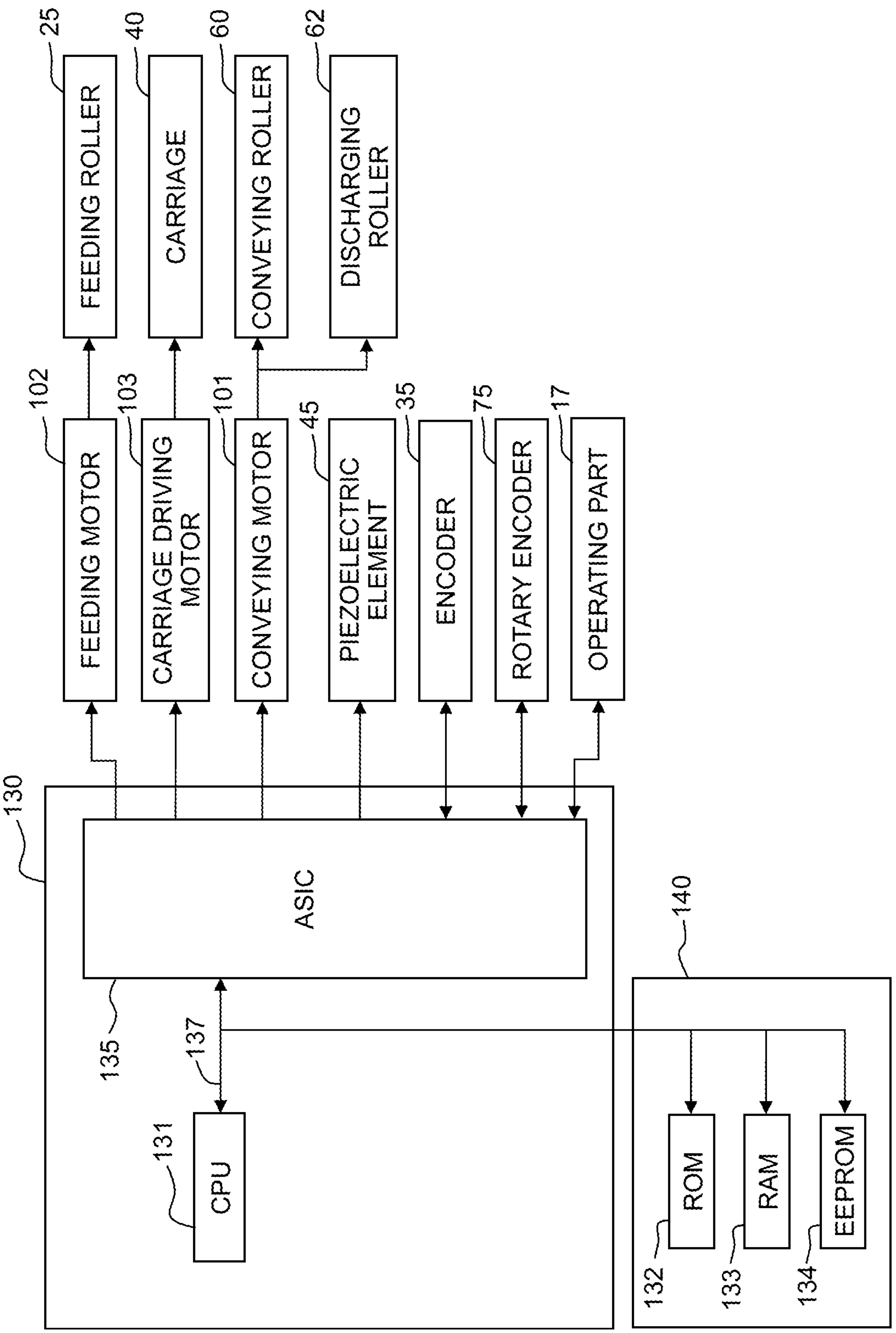
FIG. 4 is a functional block diagram of the multifunction peripheral 10.

The conveying roller 60 and the discharging roller 62 rotate in a case that a driving force is applied to the conveying roller 60 and the discharging roller 62 from the conveying motor 101 (see FIG. 4). In a case that the conveying roller 60 rotates in a state that the sheet 12 is pinched by the conveying roller pair 59, the sheet 12 is conveyed in the conveying orientation 15 by the conveying roller pair 59, and is conveyed onto the platen 42. In a case that the discharging roller 62 rotates in a state that the sheet 12 is pinched by the discharging roller pair 44, the sheet 12 is conveyed in the conveying orientation 15 by the discharging roller pair 44, and is discharged onto the discharge tray 21. Note that a common motor may be used as the conveying motor 101 and the feeding motor 102. In such a case, there is provided a configuration wherein a driving transmitting route from the common motor to each of the rollers is switchable.

Note that a mechanism or member configured to convey the sheet 12 is not limited to the roller pairs as described above. For example, it is allowable that a conveying belt is arranged, instead of the conveying roller pair 59 and the discharging roller pair 44.

[Platen 42]

As depicted in FIG. 2, the platen 42 is arranged in the straight part 34 of the conveying route 65. The platen 42 faces the recording part 24 in the up-down direction 7. The platen 42 supports the sheet 12 which is being conveyed in the conveying route 65 from therebelow. The sheet 12 which is being conveyed in the conveying route 65 passes an area between a right end and a left end of the platen 42 in the left-right direction 9 (hereinafter referred to as a "medium passing area").

[Recording Part 24]

As depicted in FIG. 2, the recording part 24 is arranged at a location above the platen 42 so as to face the platen 42. The recording part 24 is provided with a carriage 40, a head 38 and a reservoir (storing part, storage) 80.

The carriage 40 is supported to be movable in the left-right direction 9 (an example of a "scanning direction") which is orthogonal to the conveying orientation 15, by two guide rails 56 and 57 which are arranged in the front-rear direction 8 with a spacing distance therebetween. The carriage 40 is movable, in the left-right direction 9, between a position on the right side with respect to the medium passing area and a position on the left side with respect to the medium passing area. Note that the moving direction of the carriage 40 is not limited to the left-right direction 9, and the moving direction may be a direction crossing the conveying orientation 15.

The guide rail 56 is arranged on the upstream side in the conveying orientation 15 with respect to the head 38. The guide rail 57 is arranged on the downstream side in the conveying orientation 15 with respect to the head 38. The guide rails 56 and 57 are supported by a pair of side frames (not depicted in the drawings) which are arranged, in the left-right direction 9, at the outside of the straight part 34 of the conveying route 65. The carriage 40 is moved in a case that a driving force is applied to the carriage 40 from a carriage driving motor 103 (see FIG. 4).

The encoder 35 (see FIG. 4) is arranged in the guide rail 56 or the guide rail 57. The encoder 35 includes an encoder strip extending in the left-right direction 9, and an optical sensor which is provided, on the carriage 40, at a location facing the encoder strip. A pattern, in which light transmitting parts each configured to allow a light to transmit therethrough and light shielding parts each configured to shield the light are alternately arranged at an equal pitch in the left-right direction 9, is formed in the encoder strip. The optical sensor detects the light transmitting parts and the light shielding parts, thereby detecting a pulse signal. The pulse signal is a signal in accordance with the position in the left-right direction 9 of the carriage 40. The pulse signal is outputted to the controller 130 (see FIG. 4).

The head 38 is supported by the carriage 40. A lower surface 68 of the head 38 is exposed downward, and faces the platen 42. The head 38 is provided with a plurality of nozzles 39, an ink channel 37 and a piezoelectric element 45 (see FIG. 4).

The plurality of nozzles 39 are opened in the lower surface 68 of the head 38. The ink channel 37 connects or links the reservoir 80 and the plurality of nozzles 39. The piezoelectric element 45 (see FIG. 4) deforms a part of the ink channel 37 to thereby cause a droplet of an ink (ink droplet) to be discharged or ejected downward from the nozzles 39. The piezoelectric element 45 is driven or activated by an electric supply from the controller 130 (see FIG. 4). In such a manner, the head 38 has the plurality of nozzles 39 which discharges or ejects an ink (an example of a "liquid").

The reservoir 80 is supported by the carriage 40 in a state that the reservoir 80 is installed in the carriage 40. The reservoir 80 has an internal space 81. An ink 90 is stored in the internal space 81. In the present embodiment, the recording part 24 includes one reservoir 80. An ink 90 of the black color (black ink) is stored in this one reservoir 80. Note that the color of the ink 90 stored in the reservoir 80 is not limited to the black color.

The reservoir 80 is positioned above the head 38. Note that, although the entirety of the reservoir 80 is located above the head 38 in the present embodiment, it is also allowable that a part of the reservoir 80 is located above the head 38, and another part, of the reservoir 80, which is different from the part is located at a height equal to or lower than the height of the head 38.

The internal space 81 of the reservoir 80 is communicated with the plurality of nozzle 39 via the ink channel 37. With this, the ink 90 is suppled from the internal space 81 to the plurality of nozzles 39.

An inlet port 83 via which the ink 90 is poured or supplied to the internal space 81 is provided in an upper wall 82 of the reservoir 80. The inlet port 83 penetrates the upper wall 82 in a thickness direction of the upper wall 82 so as to communicate (connect) the internal space 81 with the outside of the reservoir 80. A projected wall 84 (see FIG. 3) is provided in a surrounding of the inlet port 83 in the upper surface of the upper wall 82. A lid 85 is fitted to the projected wall 84, thereby closing the inlet port 83. In a case that the lid 85 is removed or detached from the projected wall 84, the inlet port 83 is exposed to the outside. In this state, a bottle (not depicted in the drawings) is inserted into the inlet port 83, and the ink 90 is poured from the bottle into the internal space 81 via the inlet port 83. Note that the inlet port 83 may be provided at another position which is different from the upper wall 82, provided that at the another position, an upper part of the internal space 81 is allowed to communicate with the outside.

Figure 3:
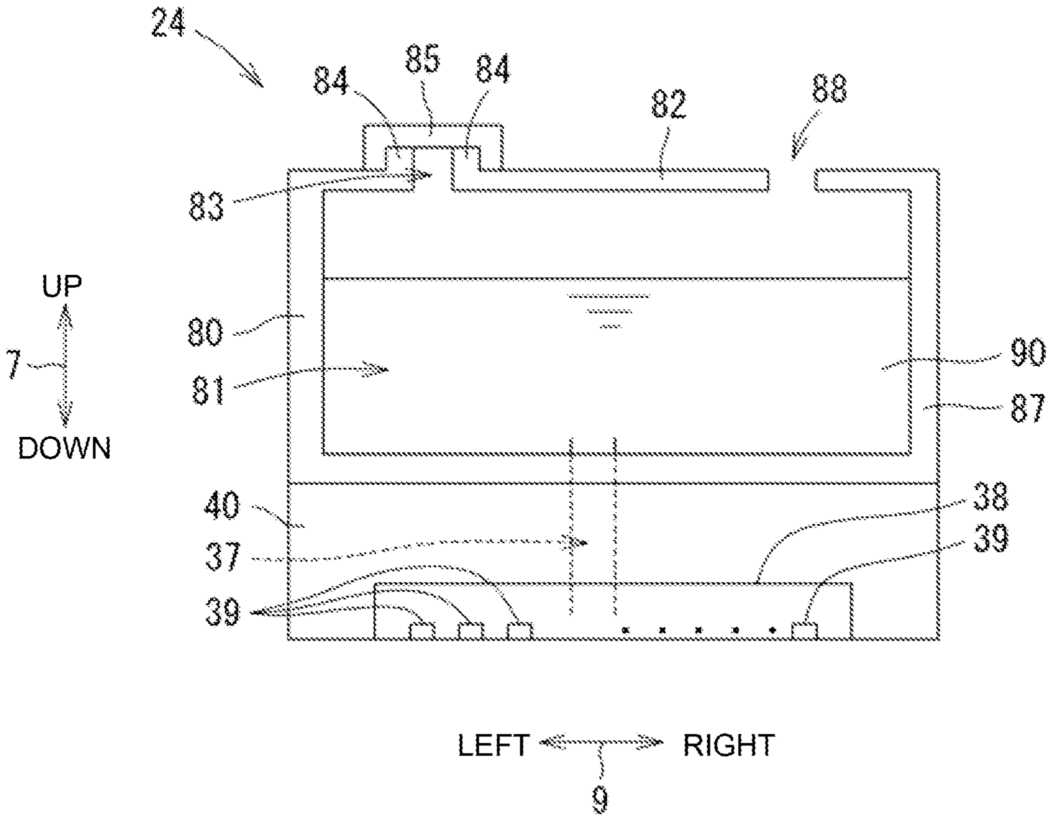
FIG. 3 is a vertical cross-sectional view depicting a cross section of a recording part 24 as being cut by a plane orthogonal to a front-rear direction 8.

As depicted in FIG. 3, an atmosphere opening port (atmosphere port) 88 is provided on the upper wall 82 of the reservoir 80. In the internal space 81 of the reservoir 80, air enters into a part, of the internal space 81, in which the ink 90 is not present. The part, of the internal space 81, into which the air has been entered is referred to as a gas layer. The atmosphere opening port 88 communicates (connects) the gas layer of the reservoir 80 with the outside of the reservoir 80.

[Rotary Encoder 75]

The rotary encoder 75 depicted in FIG. 4 is constructed of an encoder disk which is provided on a shaft of the conveying motor 101 (see FIG. 4) and which is configured to rotate together with the conveying motor 101, and an optical sensor. A pattern, in which transmitting parts each configured to allow a light to transmit therethrough and non-transmitting parts each configured not to allow the light transmit therethrough are alternately arranged at an equal pitch in a circumferential direction of the encoder disk, is formed in the encoder disk. In a case that the encoder disk rotates, a pulse signal is generated each time the transmitting part and the non-transmitting part are detected by the optical sensor. The generated pulse signal is outputted to the controller 130 (see FIG. 4). The controller 130 calculates a rotating amount of the conveying motor 101 based on the pulse signal. Note that the rotary encoder 75 may be provided on a location which is different from the conveying motor 101, for example, on the feeding motor 102, the conveying roller 60, etc.

[Controller 130 and Memory 140]

In the following, the configurations of the controller 130 and the memory 140 will be explained, with reference to FIG. 4. The controller 130 is configured to control the entire operation of the multifunction peripheral 10. The controller 130 is provided with a CPU 131 and an ASIC 135. The memory 140 is provided with a ROM 132, a RAM 133 and an EEPROM 134. The CPU 131, the ASIC 135, the ROM 132, the RAM 133 and the EEPROM 134 are connected to one another by an internal bus 137.

The ROM 132 stores therein a program for causing the CPU 131 to control a various kinds of operations, etc. The RAM 133 is used as a storage area temporarily storing data and/or a signal to be used in a case that the CPU 131 executes the program, or as a working area for data processing. The EEPROM 134 stores a setting and/or a flag, etc., to be held or stored even after the power source is switched off.

The conveying motor 101, the feeding motor 102 and the carriage driving motor 103 are connected to the ASIC 135. Driving circuit each of which controls one of the respective motors are installed in the ASIC 135. The CPU 131 outputs driving signals each of which is for rotating one of the respective motors to one of the driving circuits corresponding to one of the respective motors. Each of the driving circuits outputs a driving current, in accordance with the driving signal obtained from the CPU 131, to one of the motors corresponding thereto. With this, the corresponding motor is rotated. Namely, the controller 130 controls the feeding motor 102 to cause the feeding part 16 to feed the sheet 12. Further, the controller 130 controls the conveying motor 101 to cause the conveying roller pair 59 and the discharging roller pair 44 to convey the sheet 12. Furthermore, the controller 130 controls the carriage driving motor 103 to move the carriage 40.

Moreover, the optical sensor of the rotary encoder 75 is connected to the ASIC 135. The controller 130 calculates the rotating amount of the conveying motor 101 based on the electric signal received from the optical sensor of the rotary encoder 75. Further, the encoder 35 is connected to the ASIC 135. The controller 130 recognizes the position of the carriage 40 and/or the presence or absence of the movement of the carriage 40, based on the pulse signal received from the encoder 35.

Further, the piezoelectric element 45 is connected to the ASIC 135. The piezoelectric element 45 is driven or activated by the electric supply from the controller 130 via a non-illustrated drive circuit. The controller 130 controls the electric supply to the piezoelectric element 45 so as to selectively discharge or eject an ink droplet from the plurality of nozzles 39. Furthermore, a state sensor (not depicted in the drawings) is connected to the ASIC 135. The controller 130 performs an image recording processing, an abnormality processing, etc., which will be described later on, based on a signal received from the state sensor.

In a case that the controller 130 performs recording of an image on the sheet 12, the controller 130 alternately executes a conveying processing and a printing processing. The conveying processing is a processing of causing the conveying roller pair 59 and the discharging roller pair 44 to convey the sheet 12 only by a predetermined line feed amount. The controller 130 controls the conveying motor 101 to thereby cause the conveying roller pair 59 and the discharging roller pair 44 to execute the conveying processing. The printing processing is a processing of controlling the electric supply to the piezoelectric element 45 while moving the carriage 40 along the left-right direction 9 to thereby cause the head 38 to discharge the ink droplet from the nozzle 39. During the printing processing, the carriage 40 is positioned in the medium passing area (an area between the right end and the left end of the platen 42), and faces or is opposite to the platen 42.

During a period of time (time interval) between the conveying processing which is currently being executed (current conveying processing) and the conveying processing which is to be executed next (a next conveying processing), the controller 130 stops the sheet 12 for a predetermined period of time. Further, the controller 130 executes the printing processing during the period of time for which the sheet 12 is stopped. Namely, in the printing processing, the controller 130 executes one pass for causing the ink droplets to be discharged from the nozzles 39 while causing the carriage 40 to move leftward or rightward. With this, an image recording for the one pass is executed with respect to the sheet 12.

The controller 130 is capable of recording an image on an entire area, of the sheet 12, in which an image is recordable, by alternately and repeatedly executing the conveying processing and the printing processing. Namely, the controller 130 records an image on one piece of the sheet 12 with a plurality of passes (a pass performed for a plurality of times). In such a manner, in the multifunction peripheral 10, the carriage 40 moves with the head 38 and the reservoir 80 mounted thereon. The carriage 40 moves in the left-right direction 9, and the head 38 discharges the ink(s) while the carriage 40 is moving in the left-right direction 9.

Note that the controller 130 is not limited to or restricted by the controller 130 as described above. The controller 130 may be configured such that only the CPU 131 performs the various kinds of processing or that only the ASIC 135 performs the various kinds of processing, or that the CPU 131 and the ASIC 135 perform the various kinds of processing in a cooperative manner. Alternatively, the controller 130 may be configured such that one CPU 131 singly performs the processing, or that a plurality of pieces of the CPU 131 perform the processing in a sharing manner. Still alternatively, the controller 130 may be configured such that one ASIC 135 singly performs the processing, or that a plurality of pieces of the ASIC 135 perform the processing in a sharing manner.

[Image Recording Control by Controller 130]

Figure 5:
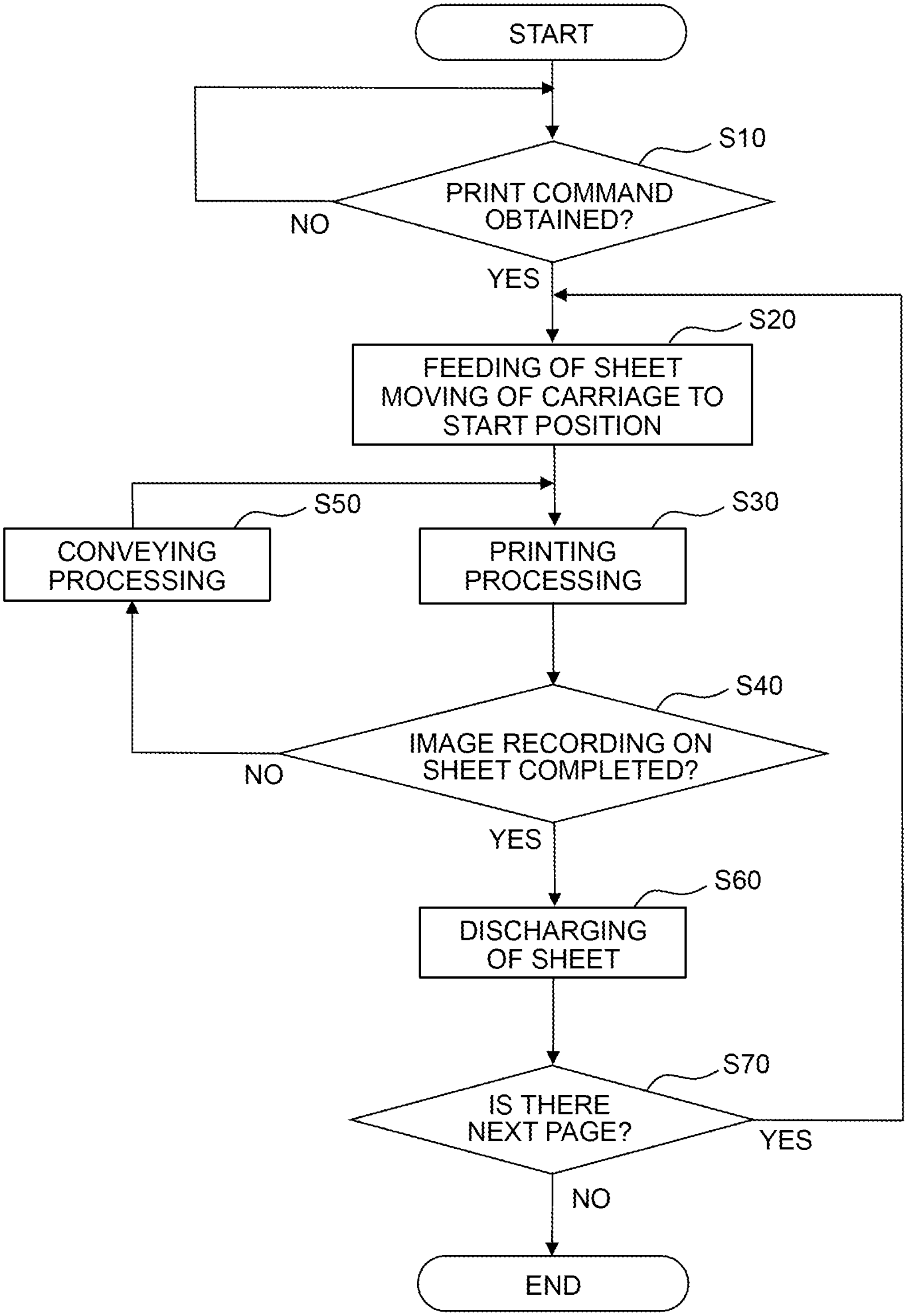
FIG. 5 is a flowchart for explaining image recording control by the multifunction peripheral 10.

In the printer part 11 configured as described above, a series of image recording controls by which the sheet 12 is conveyed and an image is recorded on the conveyed sheet 12 is executed by the controller 130. In the following, the image recording control by the controller 130 will be explained, with reference to a flowchart depicted in FIG. 5.

In a case that the image recording control is not executed, the carriage 40 is located at the outside of the medium passing area in the left-right direction 9 (this position is referred to as a "maintenance position"), and the carriage 40 does not face the platen 42.

A print command is transmitted, to the controller 130, from the operating part 17 (see FIG. 1) of the multifunction peripheral 10 and/or an external apparatus or device connected to the multifunction peripheral 10. The print command includes a command of starting the image recording control, information regarding the size of the sheet 12, and print data of image recording to be performed on the sheet 12.

In a case that the controller 130 obtains the print command (step S10: YES), the controller 130 executes feeding of a sheet 12 supported by the feed tray 20 (step S20).

In step S20, the controller 130 drives the feeding motor 102. With this, the feeding roller 25 feeds the sheet 12 supported by the feed tray 20 to the conveying route 65. Further, the controller 130 drives the conveying motor 101. With this, in a case that a forward end of the sheet 12 fed to the conveying route 65 by the feeding roller 25 reaches the conveying roller pair 59, the conveying roller pair 59 conveys the sheet 12 in the conveying orientation 15.

Next, the controller 130 drives the carriage driving motor 103 to thereby move the carriage 40 from the maintenance position to a start position. The start position is a moving start position of the carriage 40 in a case that the printing processing (step S30) is executed, and is determined based on the print data. In step S20, a feeding operation of the sheet 12 and a moving operation of the carriage 40 are executed in parallel.

Next, the controller 130 executes the printing processing (step S30). In the printing processing in step S30, the controller 130 executes one pass. Namely, the controller 130 causes the ink droplets to be discharged from the nozzles 39, while moving the carriage 40 to move from the start position. Note that, it is allowable that the carriage 40 which has started moving from the maintenance position in step S20 does not stop at the start position, and keeps moving for the print processing. Of course, it is allowable that the carriage 40 temporarily stops at the start position.

Next, the controller 130 determines whether or not the image recording on a current sheet 12 is ended, based on the information regarding the size of the sheet 12 and/or the print data included in the print command (step S40).

In a case that, in step S40, the image recording on the current sheet 12 is not ended (step S40: NO), the conveying processing is executed (step S50). In the conveying processing in step S50, the controller 130 drives the conveying motor 101 to thereby cause the conveying roller pair 59 and the discharging roller pair 44 to convey the sheet 12 by a predetermined line feed amount. Afterwards, the control by the controller 130 proceeds to step S30.

In step S40, in a case that the image recording on the current sheet 12 is ended (step S40: YES), the controller 130 causes the conveying roller pair 59 and the discharging roller pair 44 to convey the sheet 12 in the conveying orientation 15 to thereby discharge the sheet 12 to the discharge tray 21 (step S60).

Next, the controller 130 determines whether or not there still is image data which is included in the print command and which has not been recorded on the sheet 12, namely, whether or not there is image recording to be performed on a next page (step S70).

In a case that there is image recording to be performed on the next page (step S70: YES), the control by the controller 130 proceeds to step S20. In this case, the controller 130 feeds a succeeding sheet 12 from the feed tray 20 to the conveying route 65 (step S20). Note that the feeding of the succeeding sheet 12 (step S20) may be executed in parallel with the discharging of the preceding sheet 12 (step S60). In a case that there is not any image recording to be performed on the next page (step S70: NO), the controller 130 ends the series of image recording controls.

Note that although a case that the controller 130 performs the image recording normally has been explained here, it is also allowable that the controller 130 executes a processing of detecting an abnormality and a processing to be executed in a case that an abnormality has been detected (each of these processing is not depicted in the drawings), while performing the image recording.

[Condition for Maintaining Meniscus]

Figure 6A:
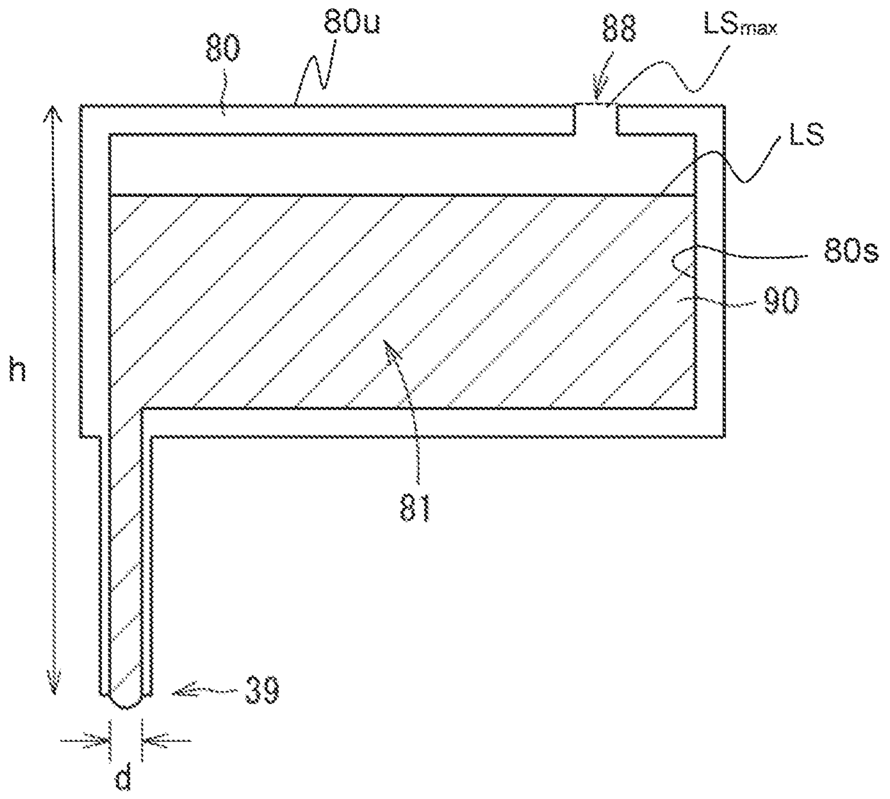

In the following, regarding a case that the multifunction peripheral 10 performs the image recording, a condition for maintaining the meniscus of the nozzle 39 of the head 38 will be explained. In FIG. 6A, the reservoir 80 and the nozzle 39 are schematically depicted. Although one piece of the nozzle 39 is depicted in FIG. 6A in order that the drawings are easily understood, the plurality of nozzles 39 are actually present.

As depicted in FIG. 6A, the ink 90 is stored in the reservoir 80 while forming a liquid surface LS. In FIG. 6A, the liquid surface LS when the ink 90 of a maximum storable amount (that is, a maximum amount of the ink 90 storable in the reservoir 80) is stored in the reservoir 80 is depicted by dotted line with the reference sign of $LS_{max}$. In the present embodiment, the maximum storable amount corresponds to an amount when the ink 90 fills the internal space 81 and the liquid surface LS of the ink 90 is coplanar with the upper end of the atmosphere opening port 88 (or upper surface 80*u* of the reservoir 80). In a case that the ink 90 of the maxim storable amount is stored in the reservoir 80, the height of the liquid surface LS is located above the opening of the nozzle 39 (that is, located at a position higher than the position of the opening of the nozzle 39). The atmosphere opening port 88 communicates (connects) the gas layer of the reservoir 80 (a part, in the internal space 81, in which the ink 90 is not present) and the outside.

Figure 6B:
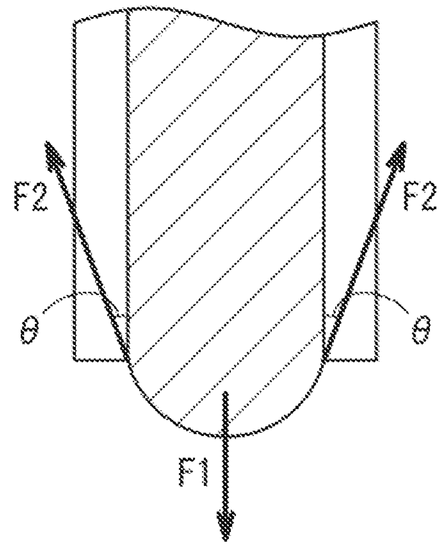

As depicted in FIG. 6B, a meniscus having a downwardly projected or convex shape is formed by the ink 90 in the opening of the nozzle 39. A gravity F1 acting downward and a surface tension F2 acting upward due to a contact between the ink 90 and the inner surface of the nozzle 39 act on the ink 90 in the vicinity of the opening of the nozzle 39. In a case that the surface tension F2 is not less than the gravity F1, the meniscus formed in the opening of the nozzle 39 is maintained.

It is provided that: an inner diameter of the nozzle 39 is (d), a head difference (waterhead difference) which is a difference in height between the meniscus (that is, the position of the base portion of the meniscus, or the position of the opening of the nozzle 39) formed in the opening of the nozzle 39 and the liquid surface LS in the maxim amount (maximum storable amount) of the ink 90 storable in the reservoir 80 is (h), a specific weight (specific gravity) of the ink 90 is (ρ), a surface tension of the ink 90 is (σ), a contact angle defined between the ink 90 and the inner surface of the nozzle 39 is (θ), and gravitational acceleration is (g). The gravity F1 acting downward on the ink in the vicinity of the opening of the nozzle 39 is given by: $\pi d^2/4\times\rho gh$. The surface tension F2 acting upward on the ink in the vicinity of the opening of the nozzle 39 is given by: $\pi d\sigma\cos\theta$. In a case that these formulae are substituted for and arranged in a relational expression: F1≤F2, the following expression (1) is obtained:

$$\rho hd/\sigma\cos\theta\leq 4/g, \quad \text{expression (1).}$$

Figure 7:
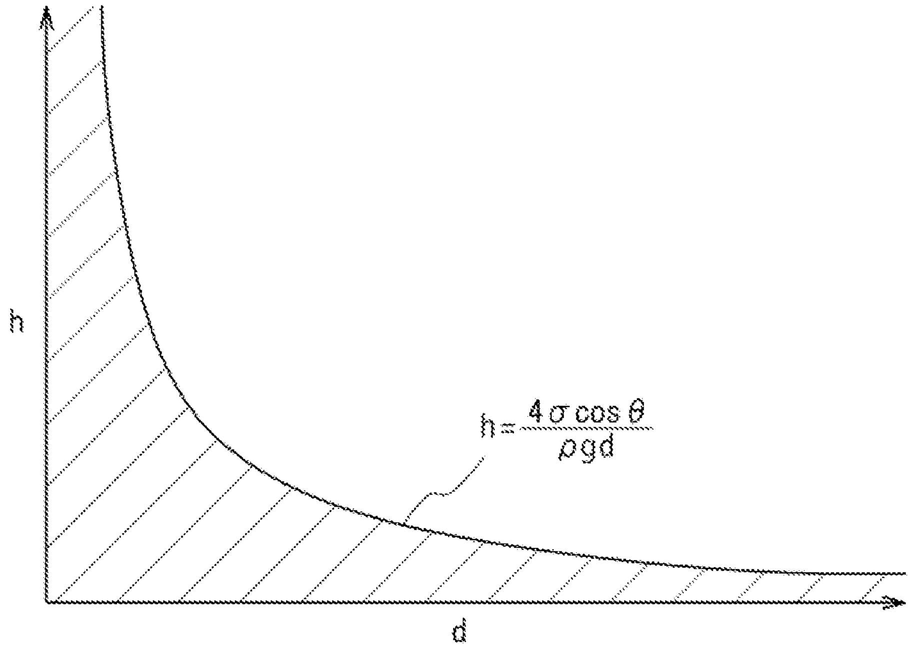
FIG. 7 is a view depicting a range in which an inner diameter (d) and a head difference (h) satisfy an expression (1).

In the multifunction peripheral 10, in a case that the specific weight (ρ) of the ink 90, the surface tension (σ) of the ink 90, the contact angle (θ) defined between the ink 90 and the inner surface of the nozzle 39 are provided, the inner diameter (d) of the nozzle 39 and the head difference (h) are determined so as to satisfy the expression (1). In a case that the inner diameter (d) is made to be the horizontal axis and that the head difference (h) is made to be the vertical axis, a range satisfying the expression (1) is a left lower side (hatched part) of a curved line indicated in FIG. 7. In a case that the combination of the value of the inner diameter (d) and the value of the head difference (h) is in the inside of the hatched part indicated in FIG. 7, the meniscus formed in the opening of the nozzle 39 is maintained.

In the following, a specific example of the range in which the inner diameter (d) of the nozzle 39 and the head difference (h) satisfy the expression (1) will be explained. The viscosity of the ink used in a printer of the ink-jet system, such as the multifunction peripheral 10, etc., is, for example, not less than 2 cps and less than 11 cps. As the ink, for example, a water-based ink which contains not less than 50 vol % and not more than 70 vol % of water is used. The specific weight (ρ) of the ink is, for example, not less than 1.03 g/cm$^3$ and not more than 1.13 g/cm$^3$. The surface tension σ of the ink is, for example, not less than 25 mN/m and not more than 37 mN/m. The contact angle (θ) defined between the inner surface of the nozzle and the ink is, for example, not less than 25° and not more than 50°.

The surface tension (σ) of the ink is obtained, for example, by using the Wilhelmy method. The contact angle (θ) defined between the inner surface of the nozzle and the ink is obtained by measuring a contact angle defined in a case of dripping the ink onto a plate formed of a same material as that of the nozzle by, for example, using the θ/2 method (half-angle method).

In the following, a set of conditions of "the specific weight (ρ) of the ink is 1.03 g/cm$^3$", "the surface tension (σ) of the ink is 37 mN/m" and "the contact angle (θ) defined between the inner surface of the nozzle and the ink is 25°" is referred to as a "first condition", and a set of conditions of "the specific weight (ρ) of the ink is 1.13 g/cm$^3$", "the surface tension (σ) of the ink is 25 mN/m" and "the contact angle (θ) defined between the inner surface of the nozzle and the ink is 50°" is referred to as a "second condition".

Figure 8A:
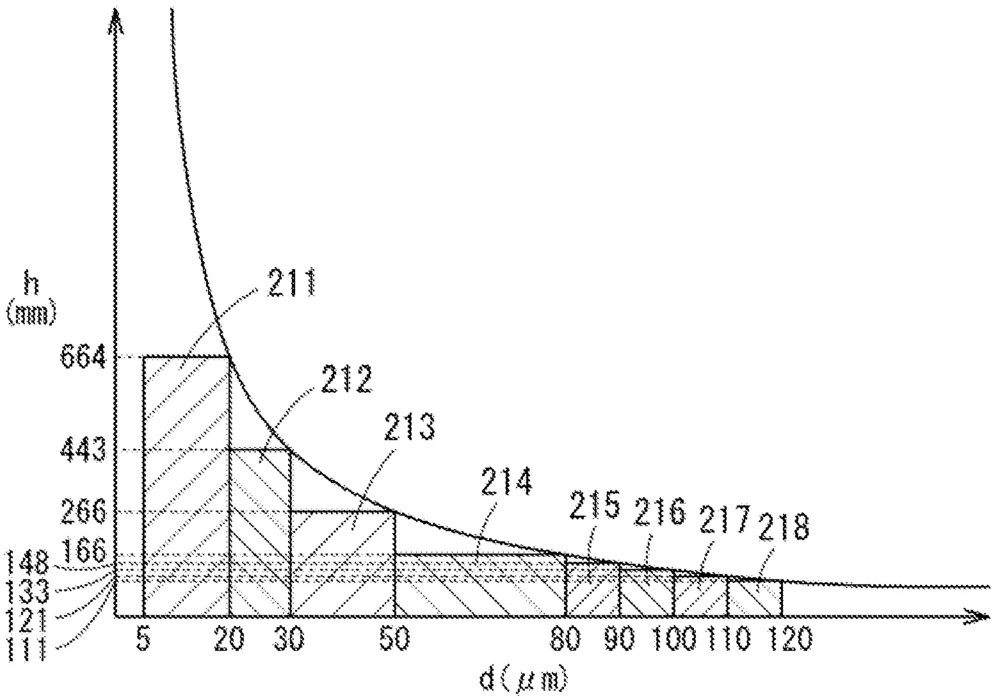
Figure 8B:
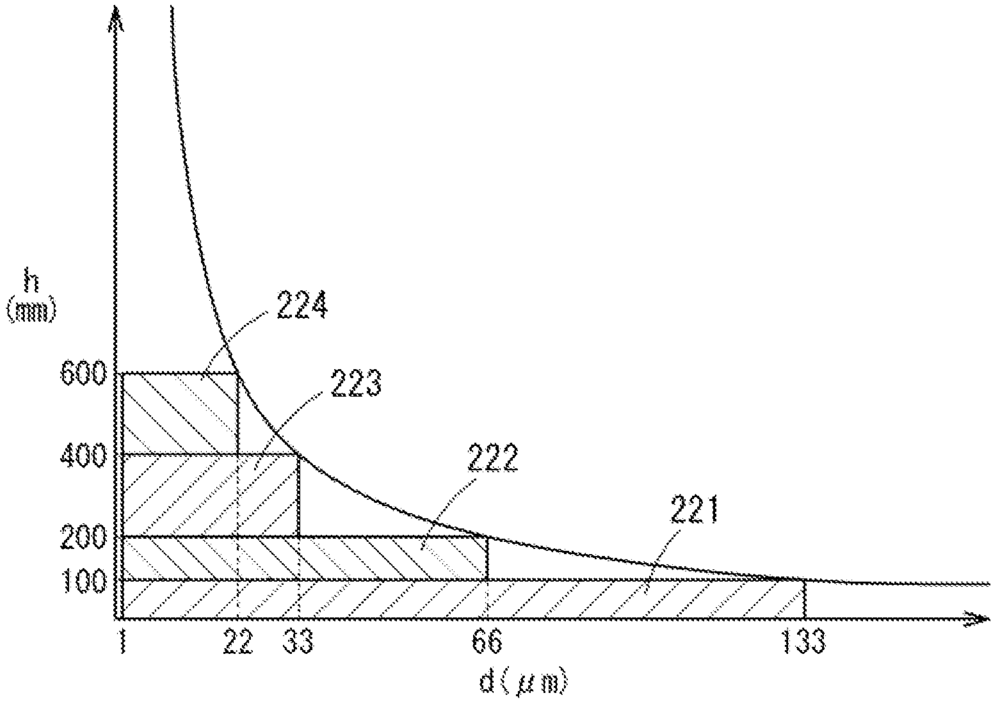

In a case that the first condition is satisfied in the multifunction peripheral 10, the range satisfying the expression (1) is a left lower side of a curved line indicated in FIGS. 8A and 8B. As indicated in FIG. 8A, eight areas 211 to 218 are set on the left lower side of the curved line. As indicated in FIG. 8B, four areas 221 to 224 are set on the left lower side of the curved line. In a case that the combination of the value of the inner diameter (d) and the value of the head difference (h) is within any one of the areas 211 to 218 and the areas 221 to 224, the expression (1) is satisfied and the meniscus formed in the opening of the nozzle 39 is maintained.

The area 211 indicated in FIG. 8A is an area in which the inner diameter (d) is not less than 5 μm and less than 20 μm, and the head difference (h) is not more than 664 mm. In a case that the inner diameter (d) is not less than 5 μm and less than 20 μm, by making the head difference (h) to be not more than 664 mm, the expression (1) is satisfied and the meniscus formed in the opening of the nozzle 39 is maintained The area 212 is an area in which the inner diameter (d) is not less than 20 μm and less than 30 μm, and the head difference (h) is not more than 443 mm. In a case that the inner diameter (d) is not less than 20 μm and less than 30 μm, by making the head difference (h) to be not more than 443 mm, the expression (1) is satisfied and the meniscus formed in the opening of the nozzle 39 is maintained.

The area 213 is an area in which the inner diameter (d) is not less than 30 μm and less than 50 μm, and the head difference (h) is not more than 266 mm. In a case that the inner diameter (d) is not less than 133 μm and less than 50 μm, by making the head difference (h) to be not more than 266 mm, the expression (1) is satisfied and the meniscus formed in the opening of the nozzle 39 is maintained.

The area 214 is an area in which the inner diameter (d) is not less than 50 μm and less than 80 μm, and the head difference (h) is not more than 166 mm. In a case that the inner diameter (d) is not less than 50 μm and less than 80 μm, by making the head difference (h) to be not more than 166 mm, the expression (1) is satisfied and the meniscus formed in the opening of the nozzle 39 is maintained.

The area 215 is an area in which the inner diameter (d) is not less than 80 μm and less than 90 μm, and the head difference (h) is not more than 148 mm. In a case that the inner diameter (d) is not less than 80 μm and less than 90 μm, by making the head difference (h) to be not more than 148 mm, the expression (1) is satisfied and the meniscus formed in the opening of the nozzle 39 is maintained.

The area 216 is an area in which the inner diameter (d) is not less than 90 μm and less than 100 μm, and the head difference (h) is not more than 133 mm. In a case that the inner diameter (d) is not less than 90 μm and less than 100 μm, by making the head difference (h) to be not more than 133 mm, the expression (1) is satisfied and the meniscus formed in the opening of the nozzle 39 is maintained.

The area 217 is an area in which the inner diameter (d) is not less than 100 μm and less than 110 μm, and the head difference (h) is not more than 121 mm. In a case that the inner diameter (d) is not less than 100 μm and less than 110 μm, by making the head difference (h) to be not more than 121 mm, the expression (1) is satisfied and the meniscus formed in the opening of the nozzle 39 is maintained.

The area 218 is an area in which the inner diameter (d) is not less than 110 μm and less than 120 μm, and the head difference (h) is not more than 111 mm. In a case that the inner diameter (d) is not less than 110 μm and less than 120 μm, by making the head difference (h) to be not more than 111 mm, the expression (1) is satisfied and the meniscus formed in the opening of the nozzle 39 is maintained.

The area 221 depicted in FIG. 8B is an area in which the inner diameter (d) is not less than 1 μm and less than 133 μm, and the head difference (h) is not more than 100 mm. In a case that the head difference (h) is not more than 100 mm, by making the inner diameter (d) to be not less than 1 μm and less than 133 μm, the expression (1) is satisfied and the meniscus formed in the opening of the nozzle 39 is maintained.

The area 222 is an area in which the inner diameter (d) is not less than 1 μm and less than 66 μm, and the head difference (h) is greater than 100 mm and not more than 200 mm. In a case that the head difference (h) is greater than 100 mm and not more than 200 mm, by making the inner diameter (d) to be not less than 1 μm and less than 66 μm, the expression (1) is satisfied and the meniscus formed in the opening of the nozzle 39 is maintained.

The area 223 is an area in which the inner diameter (d) is not less than 1 μm and less than 33 μm, and the head difference (h) is greater than 200 mm and not more than 400 mm. In a case that the head difference (h) is greater than 200 mm and not more than 400 mm, by making the inner diameter (d) to be not less than 1 μm and less than 33 μm, the expression (1) is satisfied and the meniscus formed in the opening of the nozzle 39 is maintained.

The area 224 is an area in which the inner diameter (d) is not less than 1 μm and less than 22 μm, and the head difference (h) is greater than 400 mm and not more than 600 mm. In a case that the head difference (h) is greater than 400 mm and not more than 600 mm, by making the inner diameter (d) to be not less than 1 μm and less than 22 μm, the expression (1) is satisfied and the meniscus formed in the opening of the nozzle 39 is maintained. Note that the reason by which the inner diameter (d) of the nozzle 39 is made to be not less than 1 μm is that if the inner diameter (d) is smaller than 1 μm, clogging of the ink may occur frequently. Note that, the present invention is not limited to the nozzle having the inner diameter of not less than 1 μm.

In a case that the second condition is satisfied in the multifunction peripheral 10, a condition for maintaining the meniscus formed in the opening of the nozzle 39 is as follows. That is: in a case that the inner diameter (d) is not less than 5 μm and less than 20 μm, the head difference (h) is required to be not more than 290 mm; in a case that the inner diameter (d) is not less than 20 μm and less than 30 μm, the head difference (h) is required to be not more than 193 mm; in a case that the inner diameter (d) is not less than 30 μm and less than 50 μm, the head difference (h) is required to be not more than 116 mm; in a case that the inner diameter (d) is not less than 50 μm and less than 80 μm, the head difference (h) is required to be not more than 73 mm; in a case that the inner diameter (d) is not less than 80 μm and less than 90 μm, the head difference (h) is required to be not more than 64 mm; in a case that the inner diameter (d) is not less than 90 μm and less than 100 μm, the head difference (h) is required to be not more than 58 mm; in a case that the inner diameter (d) is not less than 100 μm and less than 110 μm, the head difference (h) is required to be not more than 53 mm; and in a case that the inner diameter (d) is not less than 110 μm and less than 120 μm, the head difference (h) is required to be not more than 48 mm.

In a case that the second condition is satisfied in the multifunction peripheral 10, a condition for maintaining the meniscus formed in the opening of the nozzle 39 is as follows. That is: in a case that the head difference (h) is not more than 100 mm, the inner diameter (d) is required to be not less than 1 μm and less than 58 μm; in a case that the head difference (h) is greater than 100 mm and not more than 200 mm, the inner diameter (d) is required to be not less than 1 μm and less than 29 μm; in a case that the head difference (h) is greater than 200 mm and not more than 400 mm, the inner diameter (d) is required to be not less than 1 μm and less than 14 μm; and in a case that the head difference (h) is greater than 400 mm and not more than 600 mm, the inner diameter (d) is required to be not less than 1 μm and less than 9 μm.

In a case that in the multifunction peripheral 10, the specific weight (ρ) of the ink is not less than 1.03 g/cm$^3$ and not more than 1.13 g/cm$^2$, the surface tension (σ) of the ink is not less than 25 mN/m and not more than 37 mN/m, and the contact angle θ defined between the inner surface of the nozzle and the ink is not less than 25° and not more than 50°, the expression (1) is satisfied and the meniscus formed in the opening of the nozzle 39 is maintained, by determining the head difference (h) depending on the inner diameter (d), or by determining the inner diameter (d) depending on the head difference (h), in a similar manner as the case that the second condition is satisfied in the multifunction peripheral 10.

Effect of Embodiment

According to the present embodiment, since the inner diameter (d) of the nozzle 39 and the head difference (h) satisfy the expression (1), the surface tension F2 acting upward on the ink in the vicinity of the opening of the nozzle 39 is made to be not less than the gravity F1 acting downward on the ink in the vicinity of the opening of the nozzle 39. Accordingly, in the state that the gas layer of the reservoir 80 is communicated with the outside, the meniscus of the nozzle 39 can be maintained.

Modifications

In the above-describe embodiment, the inner diameter (d) of the nozzle 39 and the head difference (h) are determined under the condition that the maximum storable amount corresponds to the amount when the liquid surface LS of the ink 90 is coplanar with the upper end of the atmosphere opening port 88. However, there is no limitation thereto. The maximum storable amount can be set to be any amount not larger than the amount when the liquid surface LS of the ink 90 is coplanar with the upper end of the atmosphere opening port 88.

For example, in a case that any mark (for example. drawn line, projection, and the like) is formed (on a sidewall 80*s* of the reservoir 80, for example), the maximum storable amount may be set to be an amount not larger than the amount when the liquid surface LS of the ink 90 is coplanar with the upper end of the atmosphere opening port 88 and not smaller than the amount when the liquid surface LS of the ink 90 is positioned at the height of the mark. In such a case, the inner diameter (d) of the nozzle 39 and the head difference (h) are determined based on the set maximum storable amount, and the position of the maximum liquid surface $LS_{max}$ corresponding to the set maximum storable amount.

The mark may be formed to indicate the height of the ink surface corresponding to the indicated maximum storable amount to the user of the multifunction peripheral 10. Note that, the indicated maximum storable amount is different from the maximum storable amount used for determining the inner diameter (d) etc. For fail-safe design, the indicated maximum storable amount may be smaller than the maximum storable amount and the mark may be formed at a height lower than the maximum liquid surface $LS_{max}$ of the maximum storable amount.

Figure 9:
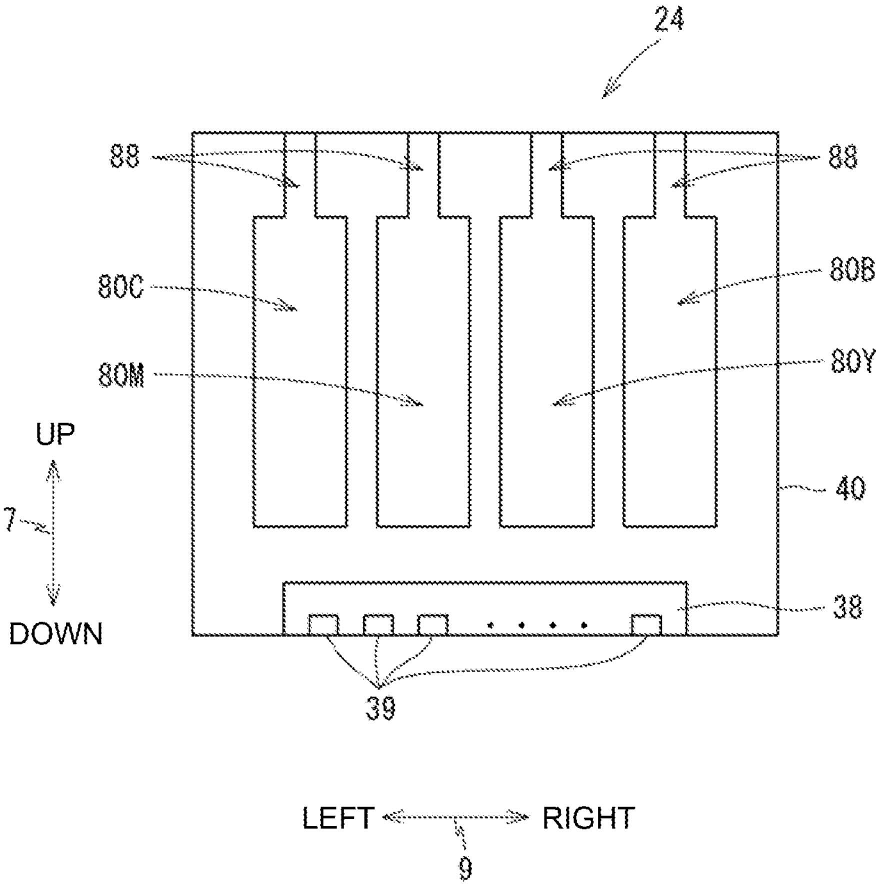
FIG. 9 is a vertical cross-sectional view of a cross section of a recording part 24, as being cut by a plane orthogonal to the front-rear direction 8.

In the above-described embodiment, although only one piece of the reservoir 80 is provided on the recording part 24, it is allowable that a plurality of reservoirs 80 are provided on the recording part 24. For example, as depicted in FIG. 9, the recording part 24 may be provided with four reservoirs 80C, 80M, 80Y and 80B.

A cyan ink (not depicted in the drawings) is stored in the reservoir 80C. A magenta ink (not depicted in the drawings) is stored in the reservoir 80M. A yellow ink (not depicted in the drawings) is stored in the reservoir 80Y. A black ink (not depicted in the drawings) is stored in the reservoir 80B. The reservoirs 80C, 80M, 80Y and 80B are arranged side by side in the left-right direction 9. The atmosphere opening port 88 is provided on each of the reservoirs 80C, 80M, 80Y and 80B. Note that the reservoirs 80C, 80M, 80Y and 80B may be arranged side by side in a direction different from the left-right direction 9, for example, in the front-rear direction 8. Further, the order of arrangement of the reservoirs 80C, 80M, 80Y and 80B are not limited to the order depicted in FIG. 9. Furthermore, the sizes of the respective reservoirs 80C, 80M, 80Y and 80B may be same as one another or different from one another.

In the above-described embodiment, the system by which the head 38 records an image on the sheet 12 is of the serial head type in which the head 38 records the image on the sheet 12 while the head 38 is being moved by the carriage 40. It is allowable, however, that the system by which the head 38 records an image on the sheet 12 is of a line head type in which the recording part 24 is not provided with the carriage 40 and the head 38 records the image on the sheet 12 without moving. In the case of the line head type, the head 38 is provided to span from the right end to the left end of the medium passing area. Further, the conveying operation and the printing operation are executed in parallel and in a continuous manner. Namely, the ink droplets are continuously discharged from the nozzles 39 while the sheet 12 is (being) conveyed. Further, in the case of the line head type, the head 38 is supported by a frame of the casing 14.

In the embodiment, the reservoir 80 is installed in the carriage 40, and the ink is replenished by pouring the ink from the inlet port 83. The reservoir 80, however, is not limited to such a configuration. For example, the reservoir 80 may be a cartridge which is attachable and detachable with respect to the carriage 40. In such a case, if the amount of the ink stored in the cartridge becomes small, or if the ink is used up, the cartridge is replaced by a new cartridge.

Figure 10:
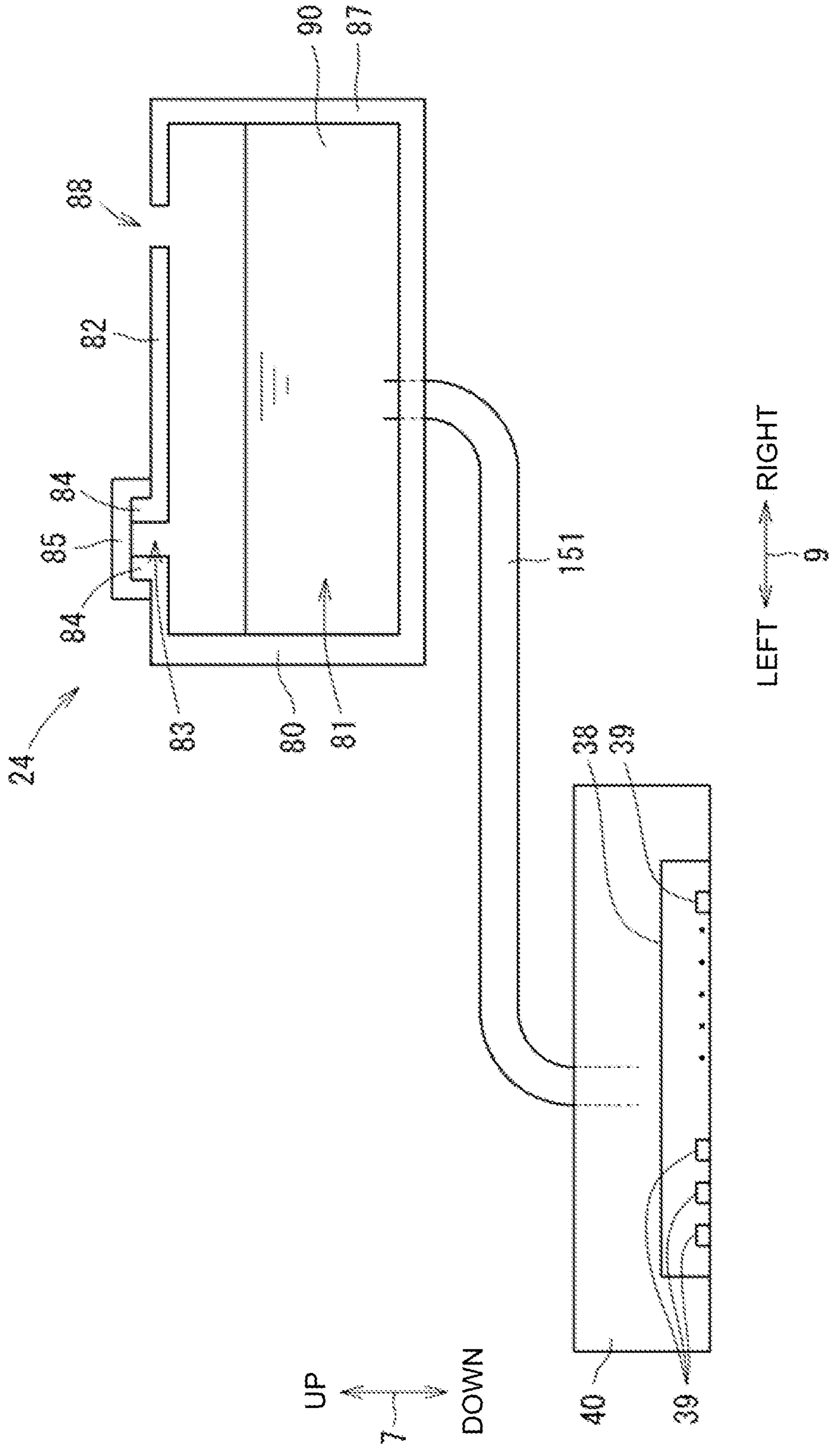
FIG. 10 is a schematic view indicating an arrangement position of a reservoir 80.

In the embodiment, although the reservoir 80 is supported by the carriage 40, it is allowable that the reservoir 80 is not supported by the carriage 40. For example, as depicted in FIG. 10, it is allowable that the reservoir 80 is arranged at a location, which is different from the carriage 40, in the multifunction peripheral 10. In such a case, the reservoir 80 and the head 38 are connected to each other by a tube 151 (an example of a "liquid channel"); the ink 90 stored in the reservoir 80 is supplied to the head 38 via the tube 151, etc. In this case also, at least a part of the reservoir 80 is located above the head 38. In this modification, the carriage 40 moves while having the head 38 mounted thereon, the reservoir 80 is not mounted on the carriage 40, and the reservoir 80 and the head 38 are connected to each other by the tube 151, etc.

Figure 11A:
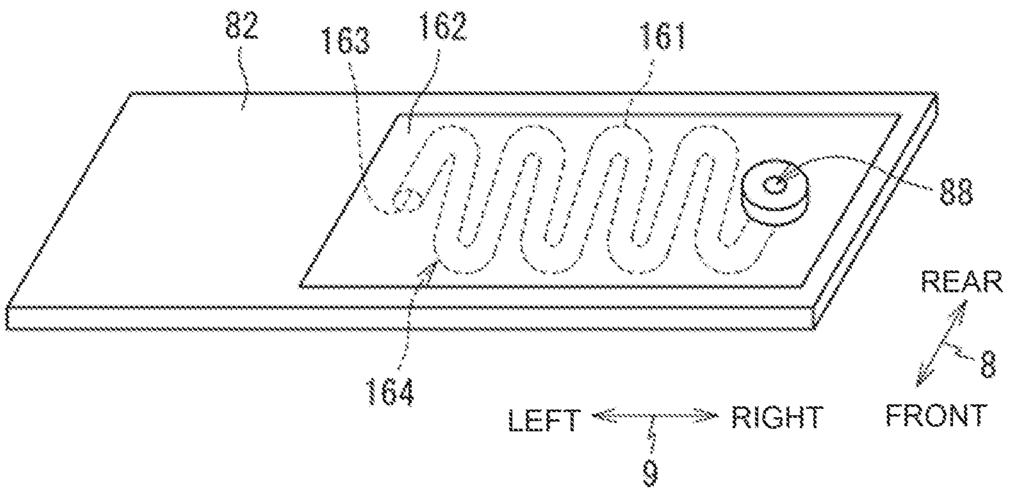
Figure 11B:
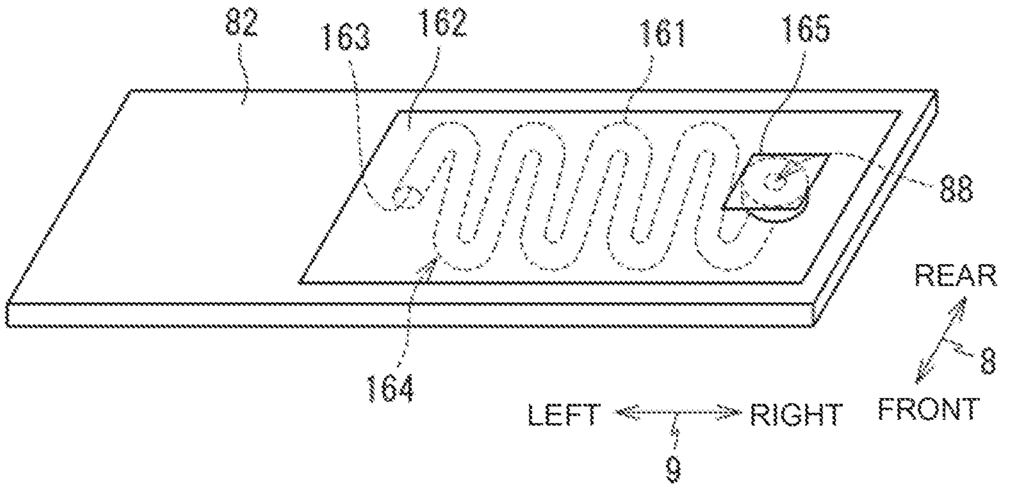

In the embodiment, although only the atmosphere opening port 88 is provided on the upper wall 82 of the reservoir 80, it is allowable that an atmosphere communicating channel 161 (an example of a "gas channel") which is continued to the atmosphere opening port 88 is further provided on the upper wall 82 of the reservoir 80, as depicted in FIGS. 11A and 11B.

In an example depicted in FIG. 11A, the atmosphere communicating channel 161 is formed to have a groove shape in the upper wall 82 of the reservoir 80, and an upper side of the atmosphere communicating channel 161 is closed by a film 162. One end of the atmosphere communicating channel 161 is communicated with the gas layer of the reservoir 80 via an opening 163. The other end of the atmosphere communicating channel 161 is communicated with the outside via the atmosphere opening port 88 formed in the upper wall 82. The atmosphere communicating channel 161 has a labyrinth structure 164 which extends along the left-right direction 9 while repeating a U-turn in the front-rear direction 8.

In an example depicted in FIG. 11B, a semipermeable membrane 165 which closes the atmosphere opening port 88 is adhered to the atmosphere opening port 88 communicating with the other end of the atmosphere communicating channel 161. The semipermeable membrane 165 is a porous membrane having minute holes blocking passage of the ink and allowing passage of the gas. For example, the semipermeable membrane 165 is formed of a fluorine resin (fluororesin) such as a polytetrafluoroethylene, a polychlorotrifluoroethylene, a tetrafluoroethylene-hexafluoropropylene copolymer, a tetrafluoroethylene-perfluoroalkyl vinyl ether copolymer, a tetrafluoroethylene-ethylene copolymer, etc. With this, the ink 90 stored in the internal space 81 of the reservoir 80 is blocked by the semipermeable membrane 165, and thus does not outflow to the outside of the reservoir 80 via the atmosphere communicating channel 161 and the atmosphere opening port 88. On the other hand, the air is capable of freely moving between the gas layer of the reservoir 80 and the outside.

The atmosphere communicating channel 161 may have a configuration having the semipermeable membrane 165 blocking the atmosphere opening port 88 but not having the labyrinth structure 164. As described above, the atmosphere communicating channel 161 may be configured to have at least either one of the labyrinth structure 164 and the semipermeable membrane 165.

In the embodiment, although any valve unit is not provided on the atmosphere opening port 88, it is allowable that a valve unit is provided on the atmosphere opening port 88. The valve unit is configured to switch the gas layer of the reservoir 80 and the outside between a communicated state and a blocked state. In this modification, in a case that the inner diameter (d) of the nozzle 39 and the head difference (h) are determined so as to satisfy the expression (1), the meniscus formed in the opening of the nozzle 39 is maintained in a case that the valve unit is in an opened state.

(2) It may be preferred that the inner diameter d is not less than 5 μm and is less than 20 μm; and the head difference h is not more than 664 mm.

(3) It may be preferred that the inner diameter d is not less than 20 μm and is less than 30 μm; and the head difference h is not more than 443 mm.

(4) It may be preferred that the inner diameter d is not less than 30 μm and is less than 50 μm; and the head difference h is not more than 266 mm.

(5) It may be preferred that the inner diameter d is not less than 50 μm and is less than 80 μm; and the head difference h is not more than 166 mm.

(6) It may be preferred that the inner diameter d is not less than 80 μm and is less than 90 μm; and the head difference h is not more than 148 mm.

(7) It may be preferred that the inner diameter d is not less than 90 μm and is less than 100 μm; and the head difference h is not more than 133 mm.

(8) It may be preferred that the inner diameter d is not less than 100 μm and is less than 110 μm; and
the head difference h is not more than 121 mm.
(9) It may be preferred that the inner diameter d is not less than 110 μm and is less than 120 μm; and
the head difference h is not more than 111 mm.
(10) It may be preferred that the inner diameter d is not less than 1 μm and is less than 133 μm; and
the head difference h is not more than 100 mm.
(11) It may be preferred that the inner diameter d is not less than 1 μm and is less than 66 μm; and
the head difference h is greater than 100 mm and is not more than 200 mm.
(12) It may be preferred that the inner diameter d is not less than 1 μm and is less than 33 μm; and
the head difference h is greater than 200 mm and is not more than 400 mm.
(13) It may be preferred that the inner diameter d is not less than 1 μm and is less than 22 μm; and
the head difference h is greater than 400 mm and is not more than 600 mm.
(14) It may be preferred that a viscosity of the liquid is not less than 2 cps and is less than 11 cps.
(15) It may be preferred that the liquid discharge apparatus further includes a carriage configured to move in a state that the head and the reservoir are mounted on the carriage.
(16) It may be preferred that the liquid discharging apparatus further includes a carriage configured to move in a state that the head is mounted on the carriage,
wherein the reservoir is not mounted on the carriage; and
the reservoir and the head are connected by a liquid channel.
(17) It may be preferred that the carriage is configured to move in a scanning direction; and
the head is configured to discharge the liquid in a case that the carriage is moving in the scanning direction.
(18) It may be preferred that the liquid discharging apparatus further includes a gas channel continued to the atmosphere port,
wherein the gas channel has at least either one of a labyrinth structure and a semipermeable membrane.

What is claimed is:

1. A liquid discharging apparatus comprising:
a head having a nozzle configured to discharge a liquid;
a reservoir configured to store the liquid such that the liquid has a liquid surface, and such that the liquid surface is positioned higher than an opening of the nozzle in a state that the reservoir stores the liquid of a maximum storable amount, the maximum storable amount being a maximum amount of the liquid capable of being stored in the reservoir;
and
an atmosphere port connecting a gas layer of the reservoir and outside of the reservoir, the gas layer being positioned in the reservoir and above the liquid surface,
wherein an inner diameter d of the nozzle and a head difference h satisfy the expression of $\rho hd/\sigma \cos\theta \leq 4/g$, provided that p is a specific weight of the liquid, o is a surface tension of the liquid, θ is a contact angle of the liquid in the nozzle and g is gravitational acceleration, the head difference h being a difference in height between a meniscus formed in the opening of the nozzle and an upper end of the atmosphere port.

2. The liquid discharging apparatus according to claim 1, wherein the inner diameter d is not less than 5 μm and is less than 20 μm; and
the head difference h is not more than 664 mm.

3. The liquid discharging apparatus according to claim 1, wherein the inner diameter d is not less than 20 μm and is less than 30 μm; and
the head difference h is not more than 443 mm.

4. The liquid discharging apparatus according to claim 1, wherein the inner diameter d is not less than 30 μm and is less than 50 μm; and
the head difference h is not more than 266 mm.

5. The liquid discharging apparatus according to claim 1, wherein the inner diameter d is not less than 50 μm and is less than 80 μm; and
the head difference h is not more than 166 mm.

6. The liquid discharging apparatus according to claim 1, wherein the inner diameter d is not less than 80 μm and is less than 90 μm; and
the head difference h is not more than 148 mm.

7. The liquid discharging apparatus according to claim 1, wherein the inner diameter d is not less than 90 μm and is less than 100 μm; and
the head difference h is not more than 133 mm.

8. The liquid discharging apparatus according to claim 1, wherein the inner diameter d is not less than 100 μm and is less than 110 μm; and
the head difference h is not more than 121 mm.

9. The liquid discharging apparatus according to claim 1, wherein the inner diameter d is not less than 110 μm and is less than 120 μm; and
the head difference h is not more than 111 mm.

10. The liquid discharging apparatus according to claim 1, wherein the inner diameter d is not less than 1 μm and is less than 133 μm; and
the head difference h is not more than 100 mm.

11. The liquid discharging apparatus according to claim 1, wherein the inner diameter d is not less than 1 μm and is less than 66 μm; and
the head difference h is greater than 100 mm and is not more than 200 mm.

12. The liquid discharging apparatus according to claim 1, wherein the inner diameter d is not less than 1 μm and is less than 33 μm; and
the head difference h is greater than 200 mm and is not more than 400 mm.

13. The liquid discharging apparatus according to claim 1, wherein the inner diameter d is not less than 1 μm and is less than 22 μm; and
the head difference h is greater than 400 mm and is not more than 600 mm.

14. The liquid discharging apparatus according to claim 1, wherein a viscosity of the liquid is not less than 2 cps and is less than 11 cps.

15. The liquid discharging apparatus according to claim 1, further comprising a carriage configured to move in a state that the head and the reservoir are mounted on the carriage.

16. The liquid discharging apparatus according to claim 15, wherein the carriage is configured to move in a scanning direction; and
the head is configured to discharge the liquid in a case that the carriage is moving in the scanning direction.

17. The liquid discharging apparatus according to claim 1, further comprising a carriage configured to move in a state that the head is mounted on the carriage,
wherein the reservoir is not mounted on the carriage; and
the reservoir and the head are connected by a liquid channel.

18. The liquid discharging apparatus according to claim 1, further comprising a gas channel continued to the atmosphere port, wherein the gas channel has at least either one of a labyrinth structure and a semipermeable membrane.

19. A liquid discharging apparatus comprising:

a head having a nozzle configured to discharge a liquid;

a reservoir configured to store the liquid such that the liquid has a liquid surface, and such that the liquid surface is positioned higher than an opening of the nozzle in a state that the reservoir stores the liquid of a maximum storable amount, the maximum storable amount being a maximum amount of the liquid capable of being stored in the reservoir; and an atmosphere port connecting a gas layer of the reservoir and outside of the reservoir, the gas layer being positioned in the reservoir and above the liquid surface, wherein a mark is formed on a side wall of the reservoir, and wherein an inner diameter d of the nozzle and a head difference h satisfy the expression of $\rho hd/\sigma \cos \theta \leq 4/g$, provided that p is a specific weight of the liquid, o is a surface tension of the liquid, θ is a contact angle of the liquid in the nozzle and g is gravitational acceleration, the head difference h being a difference in height between a meniscus formed in the opening of the nozzle and a position not lower than the mark and not higher than an upper end of the atmosphere port.

* * * * *